United States Patent
Yang et al.

(10) Patent No.: US 11,927,817 B2
(45) Date of Patent: Mar. 12, 2024

(54) OPTICAL MODULE

(71) Applicant: Hisense Broadband Multimedia Technologies Co., Ltd., Shandong (CN)

(72) Inventors: Sigeng Yang, Shandong (CN); Shenzhen Fu, Shandong (CN); Xuxia Liu, Shandong (CN)

(73) Assignee: HISENSE BROADBAND MULTIMEDIA TECHNOLOGIES CO., LTD., Shandong (KR)

( * ) Notice: Subject to any disclaimer, the term of this patent is extended or adjusted under 35 U.S.C. 154(b) by 274 days.

(21) Appl. No.: 17/477,522

(22) Filed: Sep. 16, 2021

(65) Prior Publication Data
US 2022/0003944 A1 Jan. 6, 2022

Related U.S. Application Data

(63) Continuation-in-part of application No. PCT/CN2020/111050, filed on Aug. 25, 2020.

(30) Foreign Application Priority Data

Dec. 20, 2019 (CN) .......................... 201911329907.1
Dec. 20, 2019 (CN) .......................... 201922315188.X (51) Int. Cl.
*H04B 10/00* (2013.01)
*G02B 6/42* (2006.01)
*G02B 6/43* (2006.01)

(52) U.S. Cl.
CPC ........... *G02B 6/428* (2013.01); *G02B 6/4204* (2013.01); *G02B 6/43* (2013.01)

(58) Field of Classification Search
CPC ........ G02B 6/428; G02B 6/4204; G02B 6/43; G02B 6/4206; G02B 6/4214; G02B 6/4278; G02B 6/4292; G02B 6/4261
See application file for complete search history.

(56) References Cited

U.S. PATENT DOCUMENTS 4,818,058 A * 4/1989 Bonanni .............. G02B 6/3882
385/59
6,422,761 B1 * 7/2002 Naghski ............... G02B 6/3825
385/33
(Continued)

FOREIGN PATENT DOCUMENTS

CN 108508549 A 9/2018
CN 109212672 A 1/2019
(Continued)

OTHER PUBLICATIONS

International Search Report and Written Opinion issued in corresponding International Application No. PCT/CN2020/111050 dated Oct. 29, 2020, with English translation.

*Primary Examiner* — Agustin Bello
(74) *Attorney, Agent, or Firm* — Morgan, Lewis & Bockius LLP (57) ABSTRACT

An optical module includes a lens assembly and an optical fiber holder. The lens assembly includes a lens base, a first positioning column and a second positioning column. The optical fiber holder includes a first positioning hole and a second positioning hole. The first positioning hole is disposed on a second assembly surface and corresponds to a position of the first positioning column; the first positioning hole has an opening on the second assembly surface and an opening on a first side surface connected with the second assembly surface, and the two openings are connected. The second positioning hole is disposed on the second assembly surface and corresponds to a position of the second positioning column; the second positioning hole has an opening on the second assembly surface and has an opening on a second side surface connected with the second assembly surface, and the two openings are connected.

19 Claims, 8 Drawing Sheets

(56) References Cited

U.S. PATENT DOCUMENTS

| | | | | |
|---|---|---|---|---|
| 6,909,827 B2* | 6/2005 | Schmitt | G02B 6/2746 | 385/52 |
| 7,371,014 B2* | 5/2008 | Willis | G02B 6/4204 | 385/24 |
| 7,373,031 B2* | 5/2008 | Wang | G02B 6/4292 | 385/52 |
| 7,578,623 B2* | 8/2009 | Wang | G02B 6/4292 | 385/88 |
| 8,079,125 B2* | 12/2011 | Ban | G02B 6/4246 | 385/94 |
| 8,256,972 B2* | 9/2012 | Wu | G02B 6/38 | 385/33 |
| 8,297,856 B2* | 10/2012 | Banal, Jr. | G02B 6/4244 | 385/92 |
| 8,414,199 B2* | 4/2013 | Ishigami | G02B 6/4292 | 385/94 |
| 8,469,610 B2* | 6/2013 | Shao | G02B 6/4292 | 385/76 |
| 8,478,094 B2* | 7/2013 | Hsu | G02B 6/4274 | 385/47 |
| 8,858,093 B2* | 10/2014 | Kuo | G02B 6/4206 | 385/47 |
| 8,926,199 B1* | 1/2015 | Chan | G02B 6/4292 | 385/79 |
| 9,086,552 B2* | 7/2015 | Huang | G02B 6/423 | |
| 9,128,248 B2* | 9/2015 | Lam | G02B 6/4292 | |
| 9,335,499 B2* | 5/2016 | Hou | G02B 6/4292 | |
| 9,383,519 B2* | 7/2016 | Yi | G02B 6/36 | |
| 9,435,960 B2* | 9/2016 | Huang | G02B 6/322 | |
| 9,588,312 B2* | 3/2017 | Chang | G02B 6/426 | |
| 9,645,331 B1 | 5/2017 | Kim | | |
| 9,658,413 B2* | 5/2017 | Huang | G02B 6/322 | |
| 9,720,188 B2* | 8/2017 | Barwicz | G02B 6/4231 | |
| 10,018,791 B2 | 7/2018 | Heo et al. | | |
| 10,110,311 B1* | 10/2018 | Lin | G02B 6/4249 | |
| 10,151,891 B1* | 12/2018 | Lin | G02B 6/3885 | |
| 10,215,941 B2* | 2/2019 | DeMeritt | G02B 6/3814 | |
| 10,228,523 B2* | 3/2019 | Hashiguchi | G02B 6/4243 | |
| 10,466,427 B2* | 11/2019 | Wang | G02B 6/4292 | |
| 10,795,086 B2* | 10/2020 | Matiss | G02B 6/421 | |
| 2004/0114866 A1* | 6/2004 | Hiramatsu | G02B 6/4292 | 385/39 |
| 2006/0067631 A1* | 3/2006 | Wang | G02B 6/4292 | 385/88 |
| 2011/0164851 A1* | 7/2011 | Ishigami | G02B 6/4292 | 385/93 |
| 2011/0222823 A1* | 9/2011 | Pitwon | G02B 6/423 | 385/88 |
| 2011/0293221 A1* | 12/2011 | Kaneshiro | G02B 6/4201 | 385/88 |
| 2012/0148202 A1* | 6/2012 | Banal, Jr. | G02B 6/4292 | 385/93 |
| 2012/0155802 A1* | 6/2012 | Hsu | G02B 6/4274 | 385/33 |
| 2012/0213475 A1* | 8/2012 | Selli | G02B 6/4206 | 385/33 |
| 2013/0230278 A1* | 9/2013 | Hung | G02B 6/4296 | 385/14 |
| 2013/0343698 A1* | 12/2013 | Ko | G02B 6/4292 | 385/14 |
| 2014/0169744 A1* | 6/2014 | Kuo | G02B 6/3897 | 385/74 |
| 2014/0301700 A1* | 10/2014 | Matsubara | G02B 6/40 | 29/458 |
| 2014/0301703 A1* | 10/2014 | Huang | G02B 6/4244 | 385/88 |
| 2015/0139591 A1* | 5/2015 | Huang | G02B 6/3885 | 385/88 |
| 2016/0109664 A1* | 4/2016 | Chang | G02B 6/426 | 385/33 |
| 2016/0109665 A1* | 4/2016 | Chang | G02B 6/4259 | 385/14 |
| 2016/0131847 A1* | 5/2016 | Huang | G02B 6/4214 | 385/89 |
| 2017/0075082 A1* | 3/2017 | Aihara | G02B 6/325 | |
| 2018/0267263 A1* | 9/2018 | Wang | G02B 6/4228 | |
| 2022/0003944 A1* | 1/2022 | Yang | G02B 6/4292 | |

FOREIGN PATENT DOCUMENTS

| | | |
|---|---|---|
| CN | 110023804 A | 7/2019 |
| KR | 10-2016-0064540 A | 6/2016 |

* cited by examiner

OPTICAL MODULE

CROSS-REFERENCE TO RELATED APPLICATION

This application is a continuation in part of International Patent Application No. PCT/CN2020/111050 filed on Aug. 25, 2020, which claims priority to Chinese Patent Application No. 201911329907.1, filed on Dec. 20, 2019, and Chinese Patent Application No. 201922315188.X, filed on Dec. 20, 2019, which are incorporated herein by reference in their entireties.

TECHNICAL FIELD

The present disclosure relates to the field of optical communication technologies, and in particular, to an optical module.

BACKGROUND

In optical fiber communication system, an optical module plays a role of achieving interconversion between an optical signal and an electrical signal. The optical module generally includes an optical transmitter, an optical receiver and other devices. The optical transmitter is used to convert the electrical signal into the optical signal and then transmit the optical signal through an optical fiber, and the optical receiver is used to convert the optical signal transmitted by the optical fiber into the electrical signal.

SUMMARY

An optical module is provided. The optical module includes a shell, a circuit board, a light-emitting chip, a lens assembly, a first optical fiber ribbon and an optical fiber holder. The circuit board is located in the shell. The light-emitting chip is disposed on the circuit board and is configured to convert an electrical signal from the circuit board into an optical signal. The lens assembly is disposed on the circuit board, covers the light-emitting chip, and is configured to change a propagation direction of the optical signal transmitted into the lens assembly. An end of the first optical fiber ribbon is optically connected to the lens assembly, and another end of that is optically connected to an optical fiber socket, and the first optical fiber ribbon is configured to transmit the optical signal to the optical fiber socket. The optical fiber holder is configured to fix the end of the first optical fiber ribbon that is connected to the lens assembly. The optical fiber holder is connected to the lens assembly. The lens assembly includes a lens base, a first positioning column and a second positioning column. The lens base is disposed on the circuit board, covers the light-emitting chip, and is configured to change the propagation direction of the optical signal transmitted into the lens assembly. The first positioning column is disposed on a side of a first assembly surface and extends toward the optical fiber holder. The second positioning column is disposed on another side of the first assembly surface and extends toward the optical fiber holder. The first assembly surface is a surface of the lens base opposite to the optical fiber holder. The optical fiber holder includes a first positioning hole and a second positioning hole. The first positioning hole is disposed on a second assembly surface, corresponds to a position of the first positioning column, and is configured to allow the first positioning column to be inserted; the first positioning hole has an opening on the second assembly surface and an opening on a first side surface connected to the second assembly surface respectively, and the two openings are connected. The second positioning hole is disposed on the second assembly surface, corresponds to a position of the second positioning column, and is configured to allow the second positioning column to be inserted; the second positioning hole has an opening on the second assembly surface and an opening on a second side surface connected to the second assembly surface respectively, and the two openings are connected. The second assembly surface is a surface of the optical fiber holder opposite to the lens base.

BRIEF DESCRIPTION OF THE DRAWINGS

In order to describe technical solutions in the present disclosure more clearly, accompanying drawings to be used in the description of some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual dimensions of products, actual processes of methods and actual timings of signals involved in the embodiments of the present disclosure.

DETAILED DESCRIPTION

Technical solutions in some embodiments of the present disclosure will be described clearly and completely below with reference to the accompanying drawings. Obviously, the described embodiments are merely some but not all embodiments of the present disclosure. All other embodiments obtained on the basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "including, but not limited to".

In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined by "first" and "second" may explicitly or implicitly include one or more of the features. In the description of the embodiments of the present disclosure, the term "a plurality of" means two or more unless otherwise specified.

In the description of some embodiments, the term "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of "adapted to" or "configured to" herein implies an open and inclusive expression that does not exclude devices adapted to or configured to perform additional tasks or steps.

The term "about", "substantially" and "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

In optical communication technology, an optical signal is used to carry information to be transmitted, and the optical signal carrying the information is transmitted to an information processing device such as a computer through an information transmission device such as an optical fiber or an optical waveguide to complete the transmission of the information. Since the optical signal has a characteristic of passive transmission when being transmitted through the optical fiber or the optical waveguide, low-cost and low-loss information transmission may be achieved. In addition, a signal transmitted by the information transmission device such as the optical fiber or the optical waveguide is an optical signal, while a signal that can be recognized and processed by the information processing device such as the computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of interconversion between the optical signal and the electrical signal in the field of optical fiber communication technology. The optical module includes an optical port and an electrical port. The optical port is configured to implement optical communication between the optical module and the information transmission device such as the optical fiber or the optical waveguide. The electrical port is configured to implement electrical connection between the optical module and an optical network terminal (e.g., an optical modem). The electrical connection is mainly to implement power supply, transmission of an I2C signal, transmission of a data signal and grounding. The optical network terminal transmits the electrical signal to the information processing device such as the computer through a network cable or wireless fidelity (Wi-Fi).

Figure 1A:
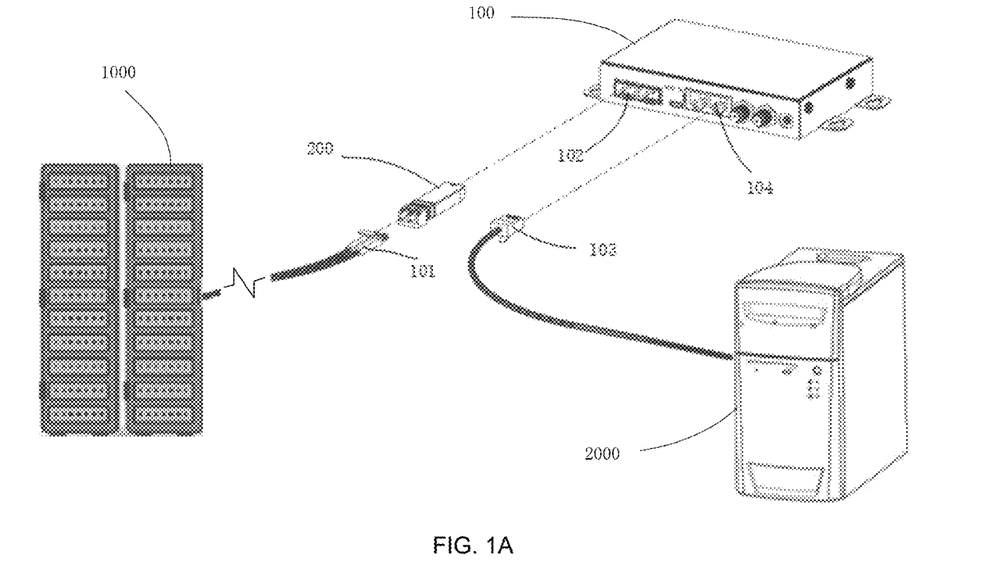
FIG. 1A is a connection relationship diagram of an optical communication system, in accordance with some embodiments.
Figure 1B:
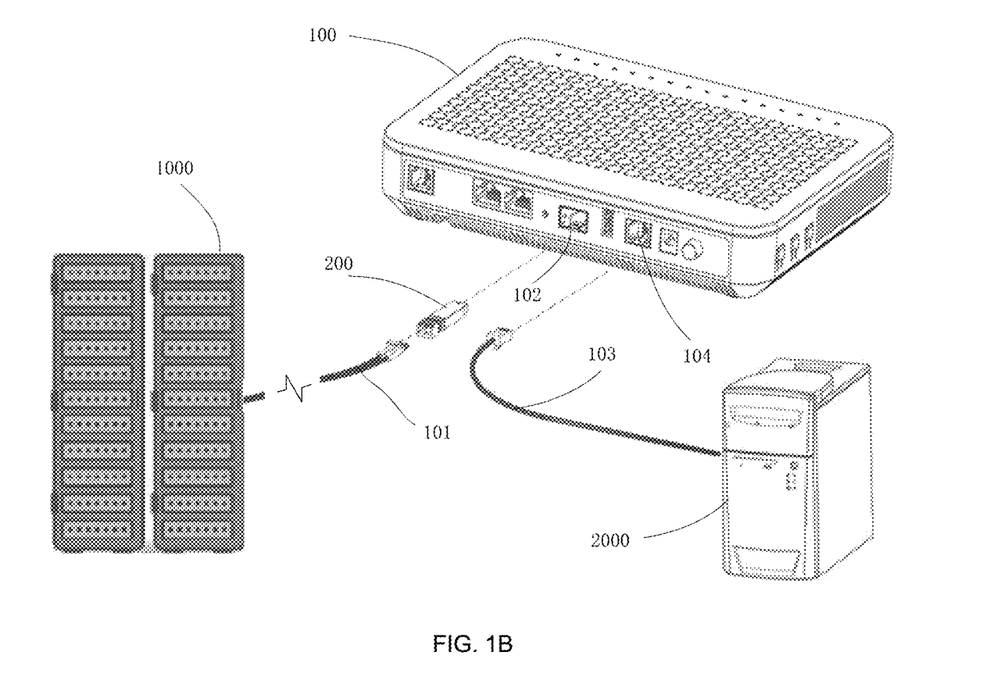
FIG. 1B is a connection relationship diagram of another optical communication system, in accordance with some embodiments.

FIG. 1A is a connection relationship diagram of an optical communication system, in accordance with some embodiments; FIG. 1B is a connection relationship diagram of another optical communication system, in accordance with some embodiments. As shown in FIGS. 1A and 1B, the optical communication system mainly includes a remote server 1000, a local information processing device 2000, an optical network terminal 100, an optical module 200, an optical fiber 101 and a network cable 103.

One terminal of the optical fiber 101 is connected to the remote server 1000, and the other terminal thereof is connected to the optical network terminal 100 through the optical module 200. The optical fiber itself may support long-distance signal transmission, such as several-kilometer (6-kilometer to 8-kilometer) signal transmission. On this basis, if a repeater is used, infinite-distance transmission may be achieved theoretically. Therefore, in a typical optical communication system, a distance between the remote server 1000 and the optical network terminal 100 may typically reach several kilometers, tens of kilometers, or hundreds of kilometers.

One terminal of the network cable 103 is connected to the local information processing device 2000, and the other terminal thereof is connected to the optical network terminal 100. The local information processing device 2000 is at least one of the followings: a router, a switch, a computer, a mobile phone, a tablet computer or a television.

A physical distance between the remote server 1000 and the optical network terminal 100 is greater than a physical distance between the local information processing device 2000 and the optical network terminal 100. Connection between the local information processing device 2000 and the remote server 1000 is completed by the optical fiber 101 and the network cable 103; and connection between the optical fiber 101 and the network cable 103 is completed by the optical module 200 and the optical network terminal 100.

The optical module 200 includes an optical port and an electrical port. The optical port is configured to access the optical fiber 101, so that the optical module 200 and the optical fiber 101 establish bidirectional optical signal connection; and the electrical port is configured to access the optical network terminal 100, so that the optical module 200 and the optical network terminal 100 establish bidirectional electrical signal connection. Interconversion between the optical signal and the electrical signal is achieved by the optical module 200, so that connection between the optical fiber 101 and the optical network terminal 100 is established. For example, the optical signal from the optical fiber 101 is converted into an electrical signal by the optical module 200 and then the electrical signal is input into the optical network terminal 100, and the electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that the bidirectional electrical signal connection between the optical network terminal 100 and the network cable 103 is established. Connection between the optical module 200 and the network cable 103 is established through the optical network terminal 100. For example, the optical network terminal 100 transmits an electrical signal from the optical module 200 to the network cable 103, and transmits an signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
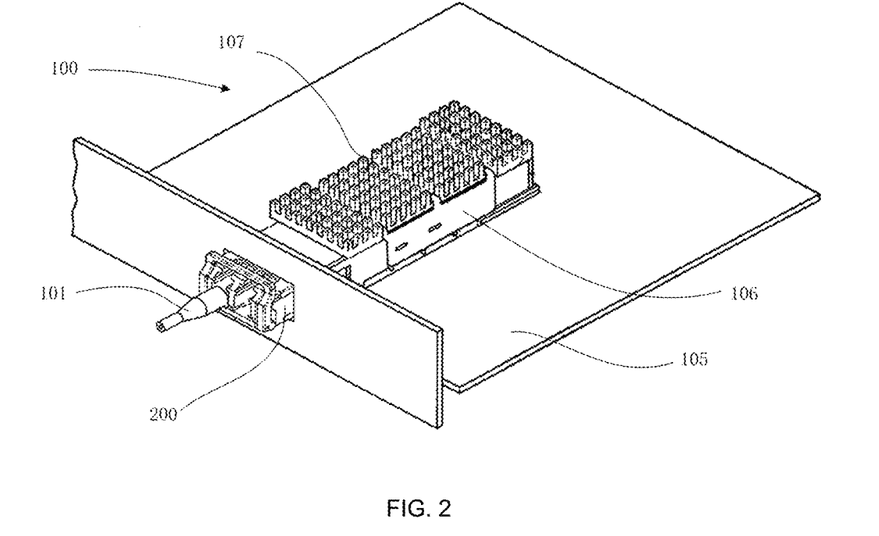
FIG. 2 is a structural diagram of an optical network terminal.

FIG. 2 is a structural diagram of an optical network terminal. In order to clearly show a connection relationship between the optical module 200 and the optical network terminal 100, FIG. 2 only shows a structure of the optical network terminal 100 related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to access the electrical port of the optical module 200; and the heat sink 107 has protruding portions such as fins that increase a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector inside the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the optical fiber 101 is established.

Figure 3:
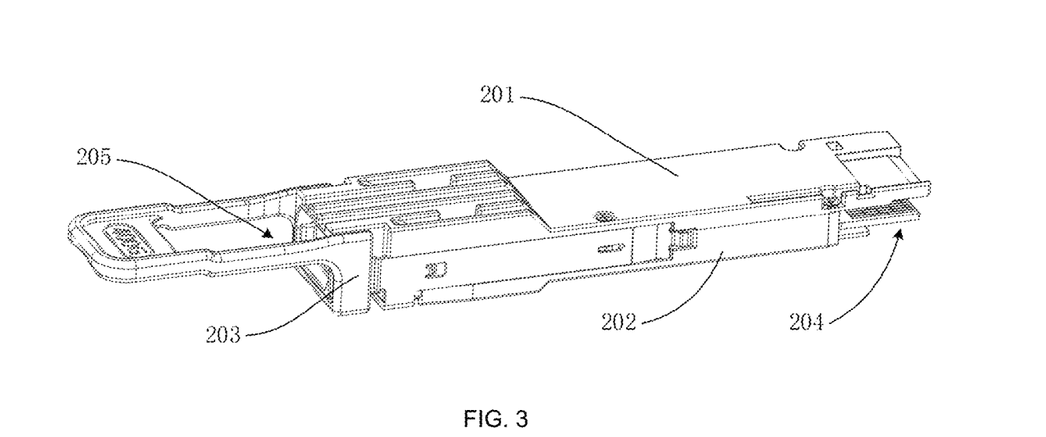
FIG. 3 is a structural diagram of an optical module, in accordance with some embodiments.
Figure 4:
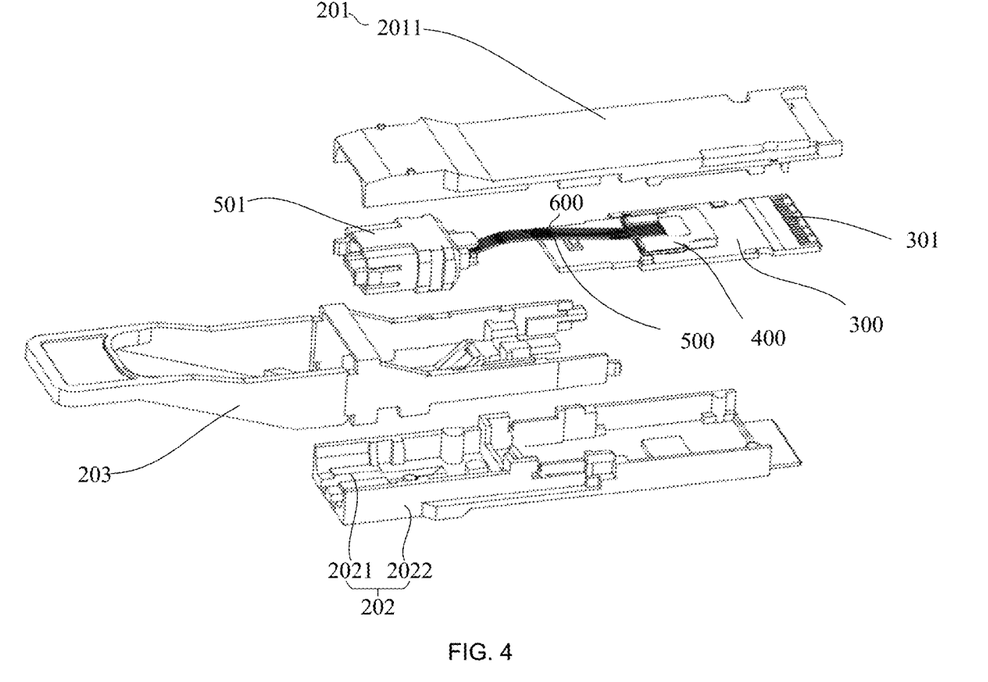
FIG. 4 is an exploded structural diagram of an optical module, in accordance with some embodiments.

FIG. 3 is a structural diagram of an optical module in accordance with some embodiments, and FIG. 4 is an exploded structural diagram of an optical module in accordance with some embodiments. As shown in FIGS. 3 and 4, the optical module 200 includes a shell, a circuit board 300 and a lens assembly 400 disposed in the shell.

The shell includes an upper shell 201 and a lower shell 202. The upper shell 201 is covered on the lower shell 202 to form the shell with two openings 204 and 205, and an outer contour of the shell is generally in a cuboid shape.

In some embodiments, the lower shell 202 includes a bottom plate 2021 and two lower side plates 2022 located on both sides of the bottom plate 2021 and disposed perpendicular to the bottom plate 2021; and the upper shell 201 includes a cover plate 2011, and the cover plate 2011 covers the two lower side plates 2022 of the lower shell 202 to form the above shell.

In some embodiments, the lower shell 202 includes a bottom plate and two lower side plates located on both sides of the bottom plate respectively and disposed perpendicular to the bottom plate; the upper shell 201 may include a cover plate and two upper side plates located on both sides of the cover plate respectively and disposed perpendicular to the cover plate; and the two upper side plates are combined with the two lower side plates respectively, so that the upper shell 201 covers the lower shell 202.

A direction in which a connecting line between two openings 204 and 205 is located may be the same as a longitudinal direction of the optical module 200, or may not be the same as the longitudinal direction of the optical module 200. For example, the opening 204 is located at an end (a right end in FIG. 3) of the optical module 200, and the opening 205 is also located at an end (a left end in FIG. 3) of the optical module 200. Alternatively, the opening 204 is located at an end of the optical module 200, and the opening 205 is located on a side of the optical module 200. The opening 204 is an electrical port, a connecting finger 301 of the circuit board 300 extends from the electrical port 204, and inserts into the master monitor (e.g., the optical network terminal 100); and the opening 205 is an optical port, which is configured to access an external optical fiber 101, so that the external optical fiber 101 is connected to the lens assembly 400 inside the optical module 200. By using an assembly mode of combining the upper shell 201 with the lower shell 202, it is possible to facilitate installation of components such as the circuit board 300 and the lens assembly 400 into the shell, and the upper shell 201 and the lower shell 202 may form encapsulation and protection for the components. In addition, when assembling the circuit board 300, the lens assembly 400 and other devices, it is possible to facilitate arrangement of positioning parts, heat dissipation parts and electromagnetic shielding parts of these components, which is conducive to implementation of automated production.

In some embodiments, the upper shell 201 and the lower shell 202 are generally made of a metal material, which facilitates electromagnetic shielding and heat dissipation.

In some embodiments, the optical module 200 further includes an unlocking component 203 located on an outer wall of the shell thereof, and the unlocking component 203 is configured to implement or release a fixed connection between the optical module 200 and the master monitor.

For example, the unlocking component 203 is located on outer walls of the two lower side plates 2022 of the lower shell 202, and includes an engagement component that is matched with the cage of the master monitor (e.g., the cage 106 of the optical network terminal 100). When the optical module 200 is inserted into the cage of the master monitor, the optical module 200 is fixed in the cage of the master monitor by the engagement component of the unlocking component 203. When the unlocking component 203 is pulled, the engaging component of the unlocking component 203 moves with the pulling, and then a connection relationship between the engagement component and the master monitor is changed to release engagement between the optical module 200 and the master monitor, so that the optical module 200 may be drawn out of the cage of the master monitor.

Figure 7:
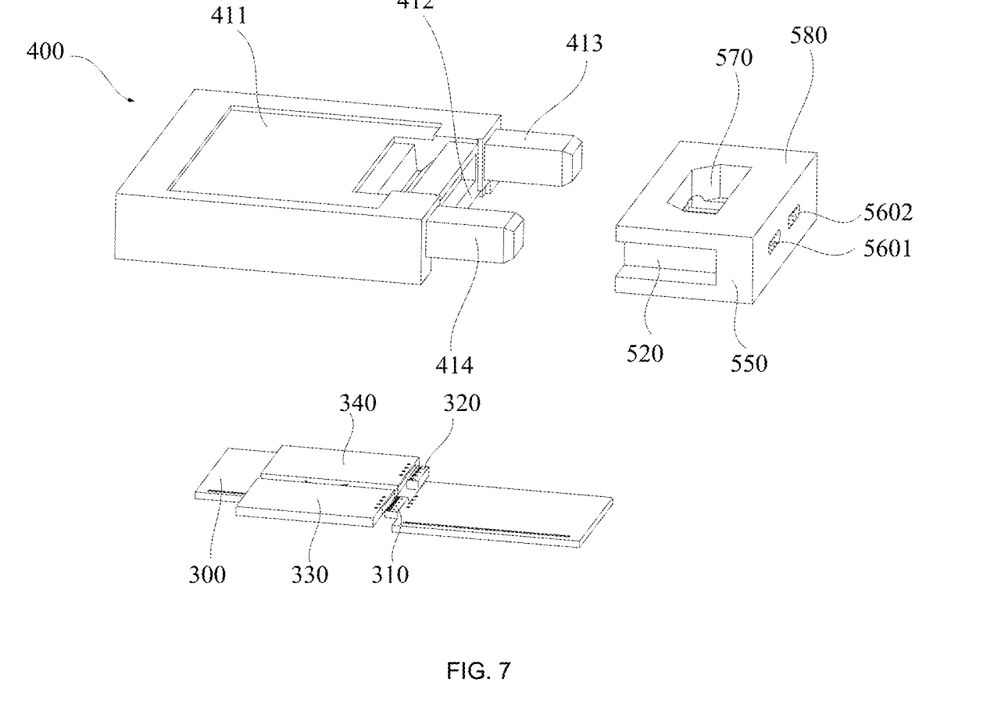
FIG. 7 is an exploded diagram of FIG. 6.

As shown in FIG. 7, the optical module 200 further includes a light-emitting chip 310, a driving chip 330, a light-receiving chip 320, a trans-impedance amplifier chip 340, a limiting amplifier chip, and a micro-processing chip disposed on the circuit board 300. The light-emitting chip 310 and the light-receiving chip 320 are directly mounted on the circuit board 300 of the optical module 200, and this method is called chip on board (COB) package in the industry. The driving chip 330 is configured to cooperate with the light-emitting chip 310 and drive the light-emitting chip 310 to generate optical signals; and the trans-impedance amplifier chip 340 is configured to cooperate with the light-receiving chip 320 and assist the light-receiving chip 320 to receive optical signals. The circuit board 300 includes a circuit wiring, and the above-mentioned chips in the optical module 200 are connected together according to a circuit design through the circuit wiring, so as to implement functions such as power supply, transmission of an electrical signal, and grounding.

The circuit board 300 is generally a rigid circuit board. The rigid circuit board may further achieve a load-bearing effect due to its hard material. For example, the rigid circuit board may stably carry the above-mentioned chips; and the rigid circuit board may further be inserted into the electrical connector in the cage of the master monitor.

The circuit board 300 further includes a connecting finger 301 formed on an end surface thereof, and the connecting finger 301 is composed of a plurality of independent pins. The circuit board 300 is inserted into the cage 106, and the circuit board 300 is conductively connected to the electrical connector in the cage 106 through the connecting finger 301. The connecting finger 301 may be disposed on only one surface (e.g., an upper surface shown in FIG. 4) of the circuit board 300, or may be disposed on both upper and lower surfaces of the circuit board to adapt to an occasion with a demand for a large number of pins. The connecting finger 301 is configured to establish electrical connection with the master monitor to achieve power supply, grounding, 120 signal communication, and data signal communication, etc.

Of course, flexible circuit boards are also used in some optical modules. As a supplement to the rigid circuit board, a flexible circuit board is generally used in conjunction with the rigid circuit board.

The optical module 200 further includes a first optical fiber ribbon 500, a second optical fiber ribbon 600, and an optical fiber socket 501. The optical fiber socket 501 forms the optical port of the optical module 200, and is configured to access the optical fiber 101. One end of the first optical fiber ribbon 500 and one end of the second optical fiber ribbon 600 are connected to the lens assembly 400, and another end of the first optical fiber ribbon 500 and another end of the second optical fiber ribbon 600 are connected to the optical fiber socket 501. An optical connection between the lens assembly 400 and the optical fiber socket 501 is realized by the first optical fiber ribbon 500 and the second optical fiber ribbon 600. An optical signal emitted by the light-emitting chip 310 enters the first optical fiber ribbon 500 after passing through the lens assembly 400, and is transmitted to the optical fiber 101 through the optical fiber socket 501, so as to implement an output of the optical signal to the outside of the optical module 200. An optical signal transmitted by the optical fiber 101 enters the lens assembly 400 through the optical fiber socket 501 and the second optical fiber ribbon 600, and then enters the light-receiving chip 320 through the lens assembly 400, so as to receive an optical signal from the outside of the optical module 200.

The first optical fiber ribbon 500 is composed of a plurality of optical fibers, which may transmit an optical signal from the lens assembly 400 to the optical fiber socket 501 to implement a transmission of the optical signal to the outside of the optical module 200; the second optical fiber ribbon 600 is composed of a plurality of optical fibers, which may transmit an optical signal from the optical fiber socket 501 to the lens assembly 400 so as to implement a receiving of the optical signal from the outside of the optical module 500. There is a good optical coupling design between the first optical fiber ribbon 500 and the lens assembly 400 and between the second optical fiber ribbon 600 and the lens assembly 400, so that multiple paths of converged light from the lens assembly 400 may be incident in the plurality of optical fibers of the first optical fiber ribbon 500, and multiple paths of light from the second optical fiber ribbon 600 may be incident in the lens assembly 400.

The optical fiber socket 501 is a connector that connects the optical module 200 and the optical fiber 101. The optical fiber socket 501 generally has a standard shape and size, which facilitates an insertion of an optical fiber plug. The optical fiber socket 501 has a plurality of optical fiber interfaces, including an interface for transmitting optical signals and an interface for receiving optical signals. A common optical fiber plug is, for example, a Multi-fiber Push On (MPO) optical fiber jumper connector. The optical fiber 101 is inserted into the optical fiber socket 501 of the optical module 200 through the optical fiber plug, so that an optical signal inside the optical module 200 may be transmitted into the external optical fiber 101 and an optical signal outside the optical module 200 may be transmitted into the optical module 200.

The lens assembly 400 is disposed on the circuit board 300 and covers the light-emitting chip 310 and the light-receiving chip 320, so that the light-emitting chip 310 and the light-receiving chip 320 are covered under the lens assembly 400, and the lens assembly 400 is configured to change a propagation direction of the optical signal. The lens assembly 400 and the circuit board 300 form a cavity enclosing the light-emitting chip 310 and the light-receiving chip 320. The optical signal emitted by the light-emitting chip 310 enters the lens assembly 400 and then enters the optical fiber 101 after being reflected by the lens assembly 400. The optical signal from the optical fiber 101 enters the lens assembly 400 and then enters the light-receiving chip 320 after being reflected by the lens assembly 400. The lens assembly 400 establishes an optical connection between the light-emitting chip 310 and the first optical fiber ribbon 500 and an optical connection between the light-receiving chip 320 and the second optical fiber ribbon 600. That is, the lens assembly 400 not only functions to seal the light-emitting chip 310 and the light-receiving chip 320, but also establishes the optical connection between the light-emitting chip 310 and the first optical fiber ribbon 500 and the optical connection between the light-receiving chip 320 and the second optical fiber ribbon 600.

The optical module 200 further includes an optical fiber holder 580. The optical fiber holder 580 is configured to fix one end of the first optical fiber ribbon 500 and one end of the second optical fiber ribbon 600 which are connected to the lens assembly 400, and is connected to the lens assembly 400, so as to ensure a stability of an optical coupling efficiency between the lens assembly 400 and the first optical fiber ribbon 500 and the second optical fiber ribbon 600.

Figure 5A:
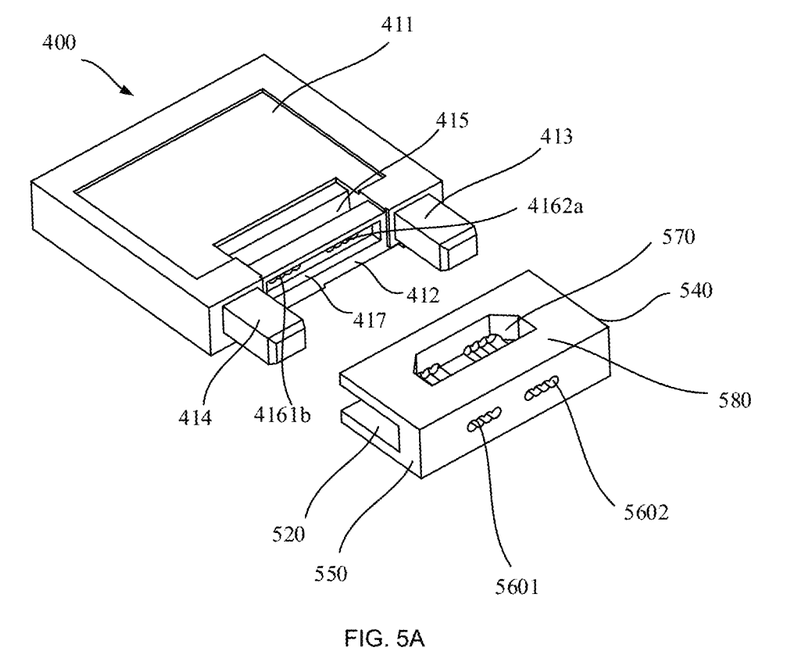
FIG. 5A is an exploded structural diagram of a lens assembly and an optical fiber holder of an optical module, in accordance with some embodiments.
Figure 5B:
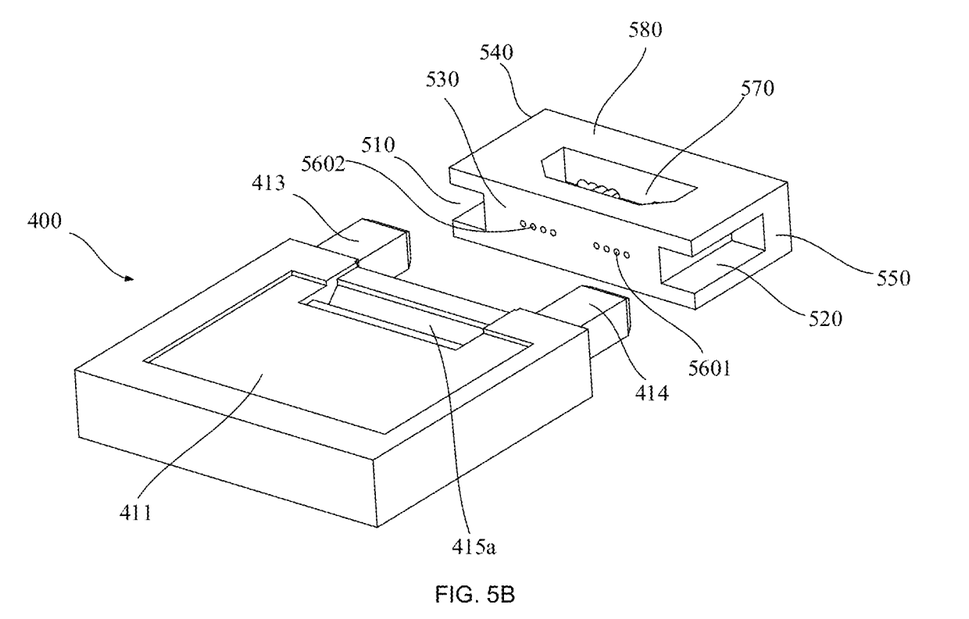
FIG. 5B is a structural diagram of the lens assembly and the optical fiber holder shown in FIG. 5A from another viewing angle.
Figure 5C:
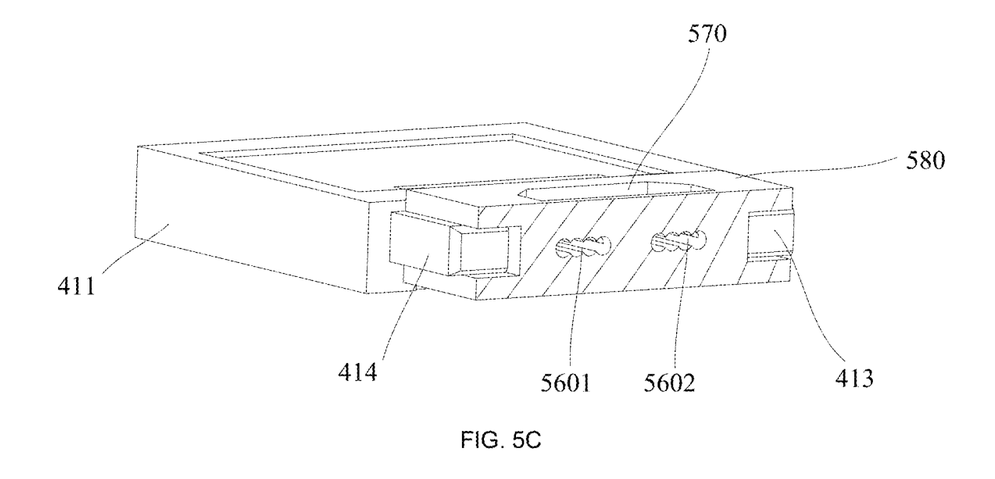
FIG. 5C is a cross-sectional view of the lens assembly and the optical fiber holder shown in FIG. 5A which are assembled together.
Figure 5D:
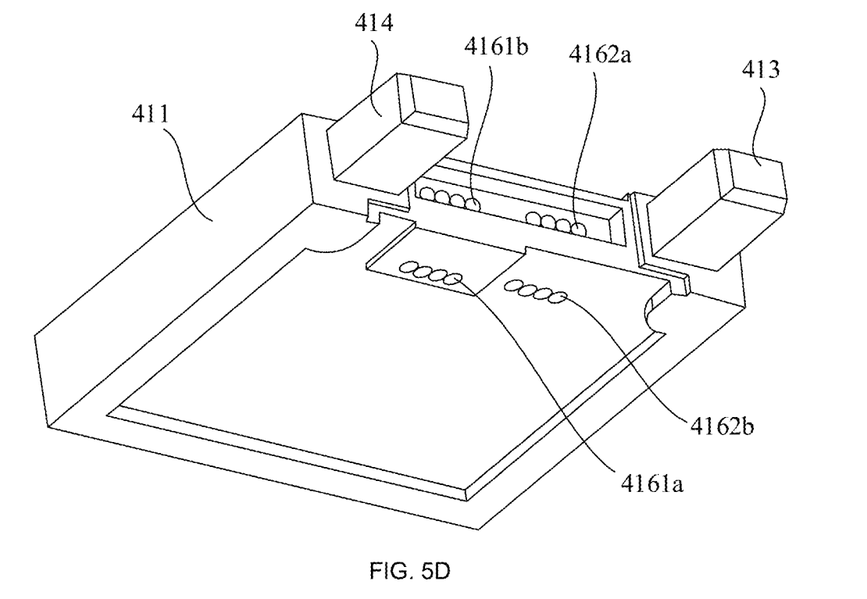
FIG. 5D is a structural diagram of a lens assembly of an optical module, in accordance with some embodiments.
Figure 6:
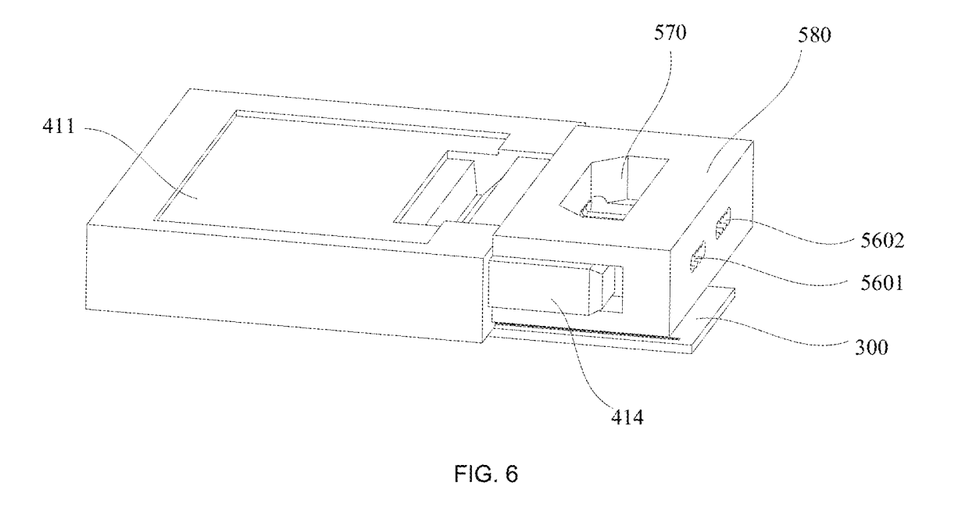
FIG. 6 is an assembly diagram of a lens assembly, an optical fiber holder, and various chips of an optical module, in accordance with some embodiments.

FIG. 5A is an exploded structural diagram of the lens assembly and the optical fiber holder of the optical module, in accordance with some embodiments; FIG. 5B is a structural diagram shown in FIG. 5A from another viewing angle; FIG. 5C is a cross-sectional view of the lens assembly and the optical fiber holder shown in FIG. 5A which are assembled together; FIG. 5D is a structural diagram of a lens assembly of an optical module, in accordance with some embodiments; FIG. 6 is an assembly diagram of various chips assembled with the lens assembly and the optical fiber holder shown in FIG. 5A; and FIG. 7 is an exploded view of the structure shown in FIG. 6.

As shown in FIGS. 5A, 5B, and 5D, the lens assembly 400 includes a lens base 411, a first positioning column 413, and a second positioning column 414.

The lens base 411 is configured to change the propagation direction of the optical signal. The lens base 411 includes a first groove 415, first collimating lenses 4161a, first focusing lenses 4161b, second collimating lenses 4162a, and second focusing lenses 4162b. The first groove 415 is disposed on a surface of the lens base 411 facing away from the circuit board 300 and is recessed toward the inside of the lens base 411. An inclined side wall of the first groove 415 forms a reflective surface 415a, and a light transmitted inside the lens base 411 is irradiated on the reflective surface 415a and is then reflected, thereby changing the propagation direction of the optical signal.

The first collimating lenses 4161a are disposed on a surface of the lens base 411 proximate to the circuit board 300 and protrude to the outside of the lens base 411; the first focusing lenses 4161b are disposed on a surface of the lens base 411 facing the optical fiber holder 580 and protrude to the outside of the lens base 411. Moreover, the first collimating lenses 4161a correspond to a position of the light-emitting chip 310, the first focusing lenses 4161b correspond to a position of the first optical fiber ribbon 500, and both the first collimating lenses 4161a and the first focusing lenses 4161b are located on an optical path of the light-emitting chip 310.

The second collimating lenses 4162a are disposed on the surface of the lens base 411 facing the optical fiber holder 580 and protrude to the outside of the lens base 411; the second focusing lenses 4162b are disposed on the surface of the lens base 411 proximate to the circuit board 300 and protrude to the outside of the lens base 411. Moreover, the second collimating lenses 4162a correspond to a position of the second optical fiber ribbon 600, the second focusing lenses 4162b correspond to a position of the light-receiving chip 320, and both the second collimating lenses 4162a and the second focusing lenses 4162b are located on an optical path of the light-receiving chip 320.

It will be noted that the number of the first collimating lenses 4161a is the same as that of the first focusing lenses 4161b, and corresponds to the number of the plurality of optical fibers included in the first optical fiber ribbon 500. The number of the second collimating lenses 4162a is the same as that of the second focusing lenses 4162b, and corresponding to the number of the plurality of optical fibers included in the second optical fiber ribbon 600. For example, FIG. 5A shows a plurality of first focusing lenses 4161b and a plurality of second collimating lenses 4162a.

Figure 8A:
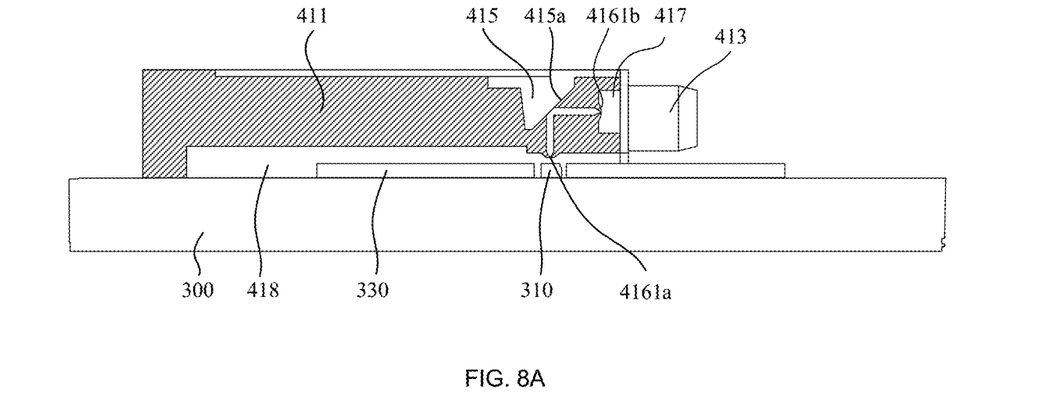
FIG. 8A is a cross-sectional view of an optical module, in accordance with some embodiments.
Figure 9A:
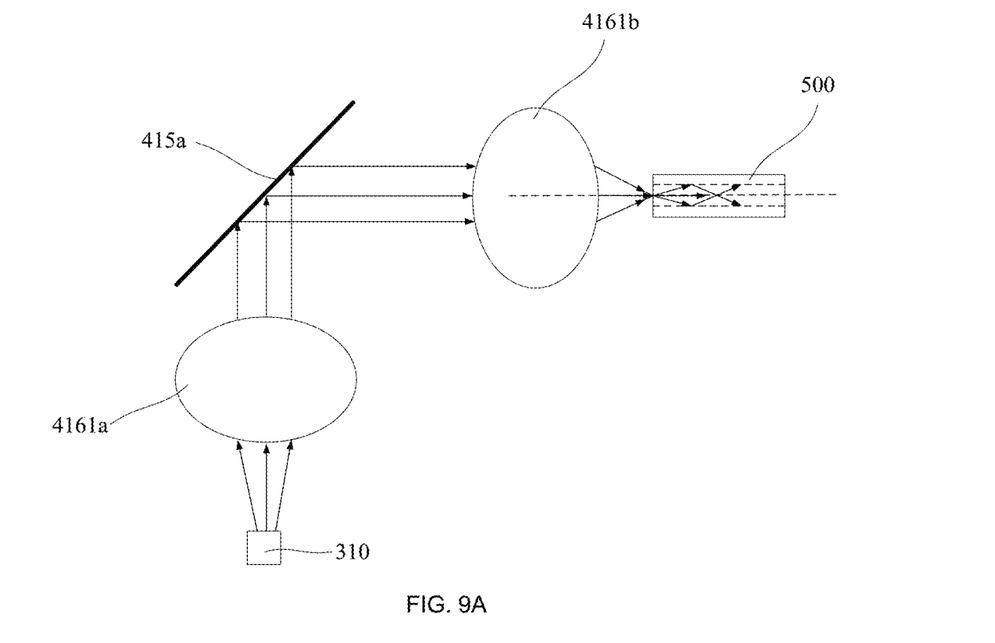
FIG. 9A is a diagram showing an optical path of an optical signal sent out by an optical module, in accordance with some embodiments.

As shown in FIG. 8A and FIG. 9A, during a process of the optical module 200 transmitting an optical signal to the outside, a light carrying signals emitted by the light-emitting chip 310 is converted into a parallel light by the first collimating lenses 4161a and then directed to the reflective surface 415a. The parallel light is reflected by the reflective surface 415a and then directed to the first focusing lenses 4161b, and is converged by the first focusing lenses 4161b to enter the first optical fiber ribbon 500.

Figure 9B:
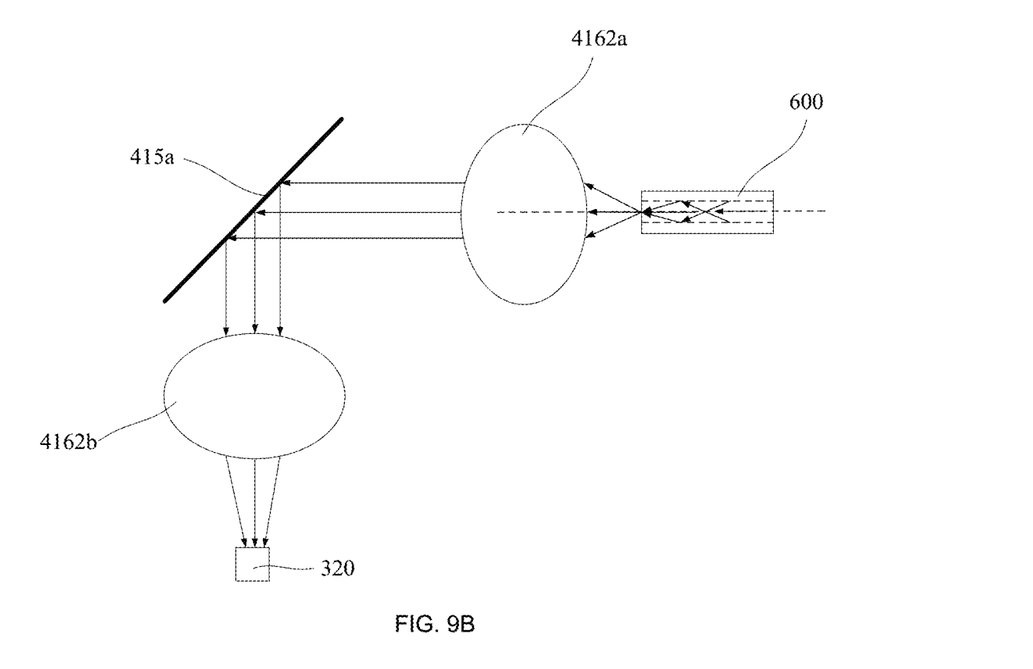
FIG. 9B is a diagram showing an optical path of an external optical signal received by an optical module, in accordance with some embodiments.

As shown in FIG. 8A and FIG. 9B, during a process of the optical module 200 receiving an optical signal from the outside, a light carrying signals is transmitted to the second collimating lenses 4162a by the second optical fiber ribbon 600, and is converted into a parallel light by the second collimating lenses 4162a and then directed to the reflective surface 415a. The parallel light is reflected by the reflective surface 415a and then directed to the second focusing lenses 4162b, and is converged by the second focusing lenses 4162b to enter the light-receiving chip 320. The light-receiving chip 320 in FIG. 8A is blocked by the light-emitting chip 310 and is not visible.

In some embodiments, at least one of the first collimating lenses 4161a, the first focusing lenses 4161b, the second collimating lenses 4162a, and the second focusing lenses 4162b are integrally formed with the lens base 411. In a case where the first collimating lenses 4161a, the first focusing lenses 4161b, the second collimating lenses 4162a, and the second focusing lenses 4162b are all integrally formed with the lens base 411, the lens base 411 may be used as a general term for a remaining portion of the lens assembly 400 excluding the first positioning column 413 and the second positioning column 414. The circuit board 300 is configured to provide electrical signals to the light-emitting chip 310. After the light-emitting chip 310 converts an electrical signal into an optical signal, a light carrying the signal enters the lens assembly 400. After a propagation direction of the optical signal is changed by the lens assembly 400, the light carrying the signal enters the first optical fiber ribbon 500 and is transmitted to the outside of the optical module 200 through the optical fiber socket 501, thereby implementing a conversion of the electrical signal into the optical signal. An optical signal transmitted from the outside enters the lens assembly 400 through the optical fiber socket 501 and the second optical fiber ribbon 600, and the optical signal is received by the light-receiving chip 320 after changing a propagation direction through the lens assembly 400. The light-receiving chip 320 converts the optical signal into an electrical signal and transmits the electrical signal to the circuit board 300, and then the electrical signal is transmitted to the optical network terminal 100 through the connecting finger 301, thereby implementing the conversion of the optical signal into the electrical signal.

As shown in FIG. 5A, the lens base 411 further includes a second groove 417. The second groove 417 is disposed on the surface of the lens base 411 facing the optical fiber holder 580 (e.g., a first assembly surface 412 described below). The second collimating lenses 4162a and the first focusing lenses 4161b are accommodated in the second groove 417, and the first optical fiber ribbon 500 and the second optical fiber ribbon 600 also extend into the second groove 417. In this way, an optical signal reflected by the reflective surface 415a may be converged and injected into the first optical fiber ribbon 500 through the first focusing lenses 4161b, or an optical signal in the second optical fiber ribbon 600 may be collimated by the second collimating lenses 4162a and then directed toward the reflective surface 415a. The second groove 417 may fix and limit the first optical fiber ribbon 500 and the second optical fiber ribbon 600, so as to ensure good optical coupling between the first focusing lenses 4161b and the first optical fiber ribbon 500, and between the second collimating lenses 4162a and the second optical fiber ribbon 600.

The first positioning column 413 is disposed on one side of a surface of the lens base 411 opposite to the optical fiber holder 580 and extends toward the optical fiber holder 580. The surface of the lens base 411 opposite to the optical fiber holder 580 is defined as the first assembly surface 412. It will be noted that the first assembly surface 412 has no special meaning. The surface is provided with the first positioning column 413 and the second positioning column 414, and the first positioning column 413 and the second positioning column 414 are configured to implement assembly of the lens assembly 400 and the optical fiber holder 580. Therefore, this surface is defined as the first assembly surface 412 for convenience of description.

The second positioning column 414 is disposed on another side of the surface of the lens base 411 opposite to the optical fiber holder 580 and extends toward the optical fiber holder 580.

As shown in FIGS. 5A and 5B, the optical fiber holder 580 includes a first positioning hole 510 and a second positioning hole 520.

The first positioning hole 510 is disposed on a surface of the optical fiber holder 580 opposite to the lens base 411, faces the first positioning column 413, and is configured to allow the first positioning post 413 to be inserted. The surface of the optical fiber holder 580 opposite to the lens base 411 is defined as a second assembly surface 530, and two side surfaces connected to the second assembly surface 530 are a first side surface 540 and a second side surface 550, respectively.

The second assembly surface 530 and the first side surface 540 of the optical fiber holder 580 each have an opening, and the two openings are connected to form the first positioning hole 510. That is, the first positioning hole 510 is disposed on one side of the second assembly surface 530 and penetrates the first side surface 540. The second assembly surface 530 has no special meaning. The surface of the optical fiber holder 580 opposite to the lens base 411 is provided with the first positioning hole 510 and the second positioning hole 520, and the first positioning hole 510 and the second positioning hole 520 are configured to implement assembly of the optical fiber holder 580 and the lens assembly 400. Therefore, this surface is defined as the second assembly surface 530 for convenience of description.

When talking a meaning that the first positioning hole 510 penetrates the first side surface 540, as shown in FIGS. 5A and 5B, the first positioning hole 510 is not closed on the first side surface 540, so it is a semi-closed hole. A fabricating processing of the first positioning hole 510 may be completed by punching a hole on the second assembly surface 530 and then making the hole to penetrate the first side surface 540, or by digging a groove on the first side surface 540 and then making the groove to penetrate the second assembly surface 530, which is not limited in the present disclosure.

The second positioning hole 520 is disposed on the surface of the optical fiber holder 580 opposite to the lens base 411, faces the second positioning column 414, and is configured to allow the second positioning post 414 to be inserted. The second assembly surface 530 and the second side surface 550 of the optical fiber holder 580 each have an opening, and the two openings are connected to form the second positioning hole 520. That is, the second positioning hole 520 is disposed on another side of the second assembly surface 530 and penetrates the second side surface 550.

When talking a meaning that the second positioning hole 520 penetrates the second side surface 550, as shown in FIG. 5A and FIG. 5B, the second positioning hole 520 is not closed on the second side surface 550, so it is a semi-closed hole. A fabricating processing of the second positioning hole 520 may be completed by punching a hole on the second assembly surface 530 and then making the hole to penetrate the second side surface 540, or by digging a groove on the second side surface 550 and then making the groove to penetrate the second assembly surface 530, which is not limited in the present disclosure.

As shown in FIGS. 5A and 5B, the first positioning column 413 may be inserted into the first positioning hole 510, and the second positioning post 414 may be inserted into the second positioning hole 520, so as to implement a connection between the optical fiber holder 580 and the lens assembly 400. In this way, the first optical fiber ribbon 500 and the second optical fiber ribbon 600 may extend into the second groove 417, so as to implement an optical coupling between the first optical fiber ribbon 500 and the lens assembly 400 and between the second optical fiber ribbon 600 and the lens assembly 400.

Sizes of the lens assembly 400 and the optical fiber holder 580 are generally small. In order to implement the optical coupling between the first optical fiber ribbon 500 and the lens assembly 400 and between the second optical fiber ribbon 600 and the lens assembly 400, a manufacturing precision and assembly accuracy of the lens assembly 400 and the optical fiber holder 580 are required to be high. This makes the lens assembly 400 and the optical fiber holder 580 difficult to be manufactured and assembled. However, the optical module in some embodiments of the present disclosure may greatly reduce a manufacturing difficulty and an assembling difficulty of the lens assembly 400 and the optical fiber holder 580.

In some embodiments of the present disclosure, the two positioning holes are semi-closed holes with openings on both the second assembly surface 530 and the first side surface 540 (or the second assembly surface 530 and the second side surface 550) of the optical fiber holder 580. Therefore, compared with a hole with an opening only on the second assembly surface 530 of the optical fiber holder 580, a fabricating processing of this semi-closed hole is relatively simple, which will reduce a manufacturing difficulty. In addition, a difficulty in assembling the semi-closed hole and the positioning column will also be reduced.

In addition, based on the fact that the manufacturing difficulty and the assembly difficulty are reduced, the sizes of the positioning hole and the positioning column may be enlarged, therefore, stability and reliability of them after being assembled are also improved.

It will be noted that the present disclosure does not limit shapes of the two positioning holes and the two positioning columns. Therefore, any shape of the semi-closed positioning holes and the corresponding positioning columns should be within the protection scope of the present disclosure. Of course, in order to reduce the manufacturing difficulty and assembling difficulty and improve reliability and stability of the assembly, the first positioning column 413 may be a square positioning column, and the first positioning hole 510 may be a square hole matching with the square positioning column. Or the second positioning column 414 may be a square positioning column, and the second positioning hole 520 may be a square hole matching the square positioning column.

In addition, in order to enhance a connection strength and improve the stability and reliability of the assembly, the first positioning column 413 is adhered to the first positioning hole 510 by glue, and the second positioning column 414 is adhered to the second positioning hole 520 by glue. Of course, glue bonding is just an example. Other connection methods such as welding, riveting, buckling, and clamping will all fall within the protection scope of the present disclosure, as long as they could improve connection performance of the positioning column and the positioning hole.

In addition, as shown in FIG. 6, the optical fiber holder 580 further includes first fiber holes 5601 and second fiber holes 5602. The first fiber holes 5601 and the second fiber holes 5602 penetrate through the second assembly surface 530 and a surface of the optical fiber holder 580 opposite to the second assembly surface 530.

The second groove 417 is located between the first positioning column 413 and the second positioning column 414, and the first fiber holes 5601 and the second fiber holes 5602 are located between the first positioning hole 510 and the second positioning hole 520 and correspond to a position of the second groove 417. The first optical fiber holes 5601 are configured to allow the first optical fiber ribbon 500 to pass through, and the second optical fiber holes 5602 are configured to allow the second optical fiber ribbon 600 to pass through.

It will be noted that the number of first optical fiber holes 5601 corresponds to the number of the plurality of optical fibers in the first optical fiber ribbon 500, and the number of second optical fiber holes 5602 corresponds to the number of the plurality of optical fibers in the second optical fiber ribbon 600. For example, a plurality of first fiber holes 5601 and a plurality of second fiber holes 5602 are shown in FIG. 5A.

In some embodiments of the present disclosure, as shown in FIG. 6, the optical fiber holder 580 further includes a dispensing hole 570. The dispensing hole 570 is disposed on a surface of the optical fiber holder 580 facing away from the circuit board 300 and penetrates the first optical fiber holes 5601 and the second optical fiber holes 5602. Through the dispensing hole 570, glue is injected into the first optical fiber holes 5601 and the second optical fiber holes 5602, so that the first optical fiber ribbon 500 and the second optical fiber ribbon 600 may be firmly connected in the first optical fiber holes 5601 and the second optical fiber holes 5602, respectively.

The lens assembly 400 and the optical fiber holder 580 fixed together are placed on the circuit board 300. In order to improve a stability of placement, the lens assembly 400 and the optical fiber holder 580 that are fixed together may be glued to the circuit board 300. Of course, other connection methods may also be used, which is not limited in the present disclosure.

Figure 10:
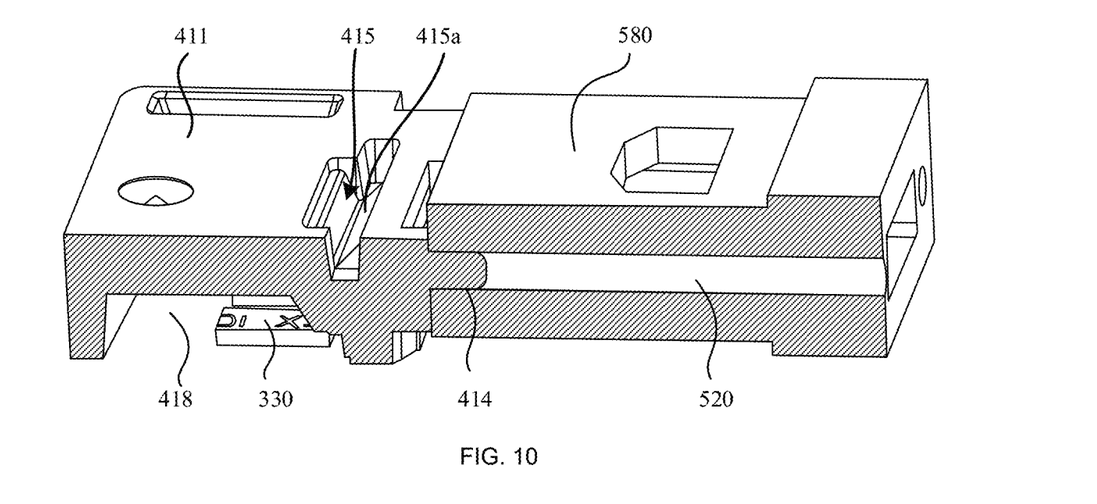
FIG. 10 is another structural diagram of an optical module, in accordance with some embodiments.

In some embodiments, as shown in FIGS. 8A and 10, the lens base 411 further includes a third groove 418, and the third groove 418 is disposed on the surface of the lens base 411 proximate to the circuit board 300. The third groove 418 and the circuit board 300 enclose an accommodating cavity, and the light-emitting chip 310 and the light-receiving chip 320 are placed in the accommodating cavity.

Figure 8B:
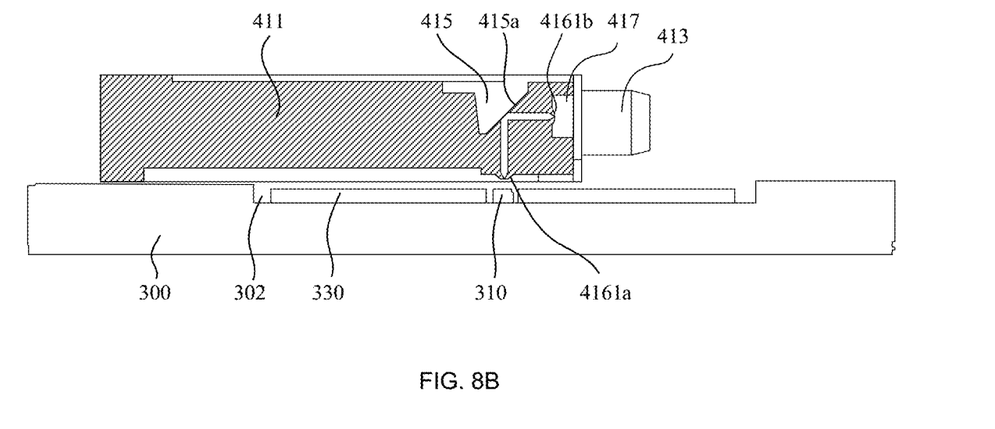
FIG. 8B is another cross-sectional view of an optical module, in accordance with some embodiments.

In some other embodiments, as shown in FIG. 8B, the circuit board 300 includes a fourth groove 302, and the fourth groove 302 is disposed on the surface of the circuit board 300 proximate to the lens base 411. The fourth groove 302 and the lens assembly 400 enclose a accommodating cavity, and the light-emitting chip 310 and the light-receiving chip 320 are placed in the accommodating cavity.

Obviously, the above two structural designs may facilitate the lens assembly 400 to implement a function of changing the propagation direction of the optical signal. The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical module, comprising:
   a shell;
   a circuit board located in the shell;
   a light-emitting chip disposed on the circuit board and configured to convert an electrical signal from the circuit board into an optical signal;
   a lens assembly disposed on the circuit board, covering the light-emitting chip, and being configured to change a propagation direction of the optical signal transmitted into the lens assembly;
   a first optical fiber ribbon; an end of the first optical fiber ribbon being optically connected to the lens assembly, and another end of that being optically connected to an optical fiber socket; the first optical fiber ribbon being configured to transmit the optical signal to the optical fiber socket; and
   an optical fiber holder configured to fix an end of the first optical fiber ribbon that is connected to the lens assembly; the optical fiber holder being connected to the lens assembly;
   wherein the lens assembly includes:

a lens base disposed on the circuit board, covering the light-emitting chip, and being configured to change the propagation direction of the optical signal transmitted into the lens assembly;

a first positioning column disposed on a side of a first assembly surface of the lens base and extending toward the optical fiber holder; and a second positioning column disposed on another side of the first assembly surface and extending toward the optical fiber holder;

wherein the first assembly surface is a surface of the lens base opposite to the optical fiber holder;

wherein the optical fiber holder includes:

a first positioning hole disposed on a second assembly surface of the optical fiber holder, corresponding to a position of the first positioning column, and being configured to allow the first positioning column to be inserted; the first positioning hole having an opening on the second assembly surface and an opening on a first side surface of the optical fiber holder connected to the second assembly surface respectively, and two openings of the first positioning hole being connected; and a second positioning hole disposed on the second assembly surface, corresponding to a position of the second positioning column, and being configured to allow the second positioning column to be inserted; the second positioning hole having an opening on the second assembly surface and an opening on a second side surface of the optical fiber holder connected to the second assembly surface respectively, and two openings of the second positioning hole being connected;

wherein the second assembly surface is a surface of the optical fiber holder opposite to the lens base.

2. The optical module according to claim 1, wherein the first positioning column is a square positioning column, and the first positioning hole is a square hole matching with the first positioning column; and/or, the second positioning column is a square positioning column, and the second positioning hole is a square hole matching with the second positioning column.

3. The optical module according to claim 1, wherein the first positioning column is adhered to the first positioning hole by glue; and/or, the second positioning column is adhered to the second positioning hole by glue.

4. The optical module according to claim 1, wherein the lens base includes a first groove disposed on a surface of the lens base facing away from the circuit board, an inclined side wall of the first groove forms a reflective surface, and the reflective surface is configured to change the propagation direction of the optical signal transmitted into the lens assembly.

5. The optical module according to claim 4, wherein the lens base further includes:

a first collimating lens disposed on a surface of the lens base proximate to the circuit board and corresponding to a position of the light-emitting chip;

a first focusing lens disposed on the first assembly surface and corresponding to a position of the first optical fiber ribbon;

wherein the optical signal emitted by the light-emitting chip is incident on the reflective surface through the first collimating lens, incident to the first focusing lens after being reflected by the reflective surface, and then incident into the first optical fiber ribbon through the first focusing lens.

6. The optical module according to claim 5, wherein the first collimating lens and the first focusing lens are integrated with the lens base.

7. The optical module according to claim 5, wherein the optical fiber holder further includes:

a first optical fiber hole disposed between the first positioning hole and the second positioning hole, penetrating the second assembly surface and a surface of the optical fiber holder opposite to the second assembly surface, and being configured to allow the first optical fiber ribbon to pass through.

8. The optical module according to claim 7, further comprising:

a light-receiving chip disposed on the surface of the circuit board, covered by the lens assembly, and being configured to convert an optical signal from the lens assembly into a current signal;

a second optical fiber ribbon; an end of the second optical fiber ribbon being optically connected to the lens assembly, and another end of that being optically connected to the optical fiber socket; the second optical fiber ribbon being configured to transmit an optical signal from outside the optical module to the lens assembly.

9. The optical module according to claim 8, wherein the lens base further includes:

a second collimating lens disposed on the first assembly surface and corresponding to a position of the second optical fiber ribbon;

a second focusing lens disposed on the surface of the lens base proximate to the circuit board and corresponding to a position of the light-receiving chip;

wherein the optical signal from the outside of the optical module is incident to the second collimating lens through the second optical fiber ribbon, incident on the reflective surface through the second collimating lens, incident to the second focusing lens after being reflected by the reflective surface, and then incident to the light-receiving chip through the second focusing lens.

10. The optical module according to claim 9, wherein the second collimating lens and the second focusing lens are integrally formed with the lens base.

11. The optical module according to claim 9, wherein the lens base further includes a second groove disposed on the first assembly surface; the second groove is located between the first positioning column and the second positioning column, and the second collimating lens and the first focusing lens are disposed in the second groove.

12. The optical module according to claim 9, wherein the optical fiber holder includes:

a second optical fiber hole disposed between the first positioning hole and the second positioning hole, penetrating the second assembly surface and the surface of the optical fiber holder opposite to the second assembly surface, and being configured to allow the second optical fiber ribbon to pass through.

13. The optical module according to claim 12, wherein the optical fiber holder further includes a dispensing hole disposed on a surface of the optical fiber holder facing away from the circuit board; the dispensing hole penetrates the first optical fiber hole and the second optical fiber hole.

14. The optical module according to claim 13, wherein the first optical fiber ribbon is fixed in the first optical fiber hole by glue, and the second optical fiber ribbon is fixed in the second optical fiber hole by glue.

15. The optical module according to claim 8, wherein the lens base includes a third groove disposed on the surface of the lens base proximate to the circuit board;

the light-emitting chip and the light-receiving chip are disposed in a cavity enclosed by the third groove and the circuit board.

16. The optical module according to claim 8, wherein the circuit board includes a fourth groove disposed on a surface of the circuit board proximate to the lens base; the light-emitting chip and the light-receiving chip are disposed in a cavity enclosed by the fourth groove and the lens base.

17. The optical module according to claim 8, further comprising:

a driving chip disposed on the circuit board, being electrically connected to the light- emitting chip, and being configured to drive the light-emitting chip to emit the optical signal.

18. The optical module according to claim 17, further comprising:

a trans-impedance amplifier chip disposed on the circuit board, being electrically connected to the light-receiving chip, and being configured to convert the current signal into a voltage signal.

19. The optical module according to claim 1, wherein the lens assembly and the optical fiber holder are adhere to the circuit board by glue.

\* \* \* \* \*

UNITED STATES PATENT AND TRADEMARK OFFICE
CERTIFICATE OF CORRECTION

| | | |
|---|---|---|
| PATENT NO. | : 11,927,817 B2 | Page 1 of 1 |
| APPLICATION NO. | : 17/477522 | |
| DATED | : March 12, 2024 | |
| INVENTOR(S) | : Sigeng Yang, Shenzhen Fu and Xuxia Liu | |

It is certified that error appears in the above-identified patent and that said Letters Patent is hereby corrected as shown below:

On the Title Page

Column 1, Item (73), replace the present listing with the following:
-- (73) HISENSE BROADBAND MULTIMEDIA TECHNOLOGIES CO., LTD., Shandong (CN) --

Signed and Sealed this
Fifteenth Day of April, 2025

Coke Morgan Stewart
*Acting Director of the United States Patent and Trademark Office*